United States Patent [19]
Austin, III

[11] Patent Number: 5,281,063
[45] Date of Patent: Jan. 25, 1994

[54] CARGO BAR LOCK ASSEMBLY

[76] Inventor: Ralph J. Austin, III, P.O. Box 2346, Blowing Rock, N.C. 28605

[21] Appl. No.: 830,885

[22] Filed: Feb. 4, 1992

[51] Int. Cl.⁵ .............................................. B60P 7/06
[52] U.S. Cl. .................... 410/151; 248/200.1; 211/105.3; 410/145
[58] Field of Search ............... 410/121, 143, 144, 145, 410/146, 147, 148, 149, 151, 152, 153; 248/200.1, 354.1; 211/105.3, 123

[56] References Cited

U.S. PATENT DOCUMENTS

| | | | |
|---|---|---|---|
| 958,752 | 5/1910 | Mackensen | 285/394 |
| 1,406,452 | 2/1928 | Fanning | 135/86 |
| 1,951,660 | 3/1934 | Klaudt | 410/145 X |
| 2,261,061 | 10/1941 | Horton | 248/200.1 |
| 2,528,706 | 11/1950 | Osborn | 135/82 |
| 2,818,280 | 12/1957 | Budnik | 285/394 |
| 2,974,931 | 3/1961 | Reel et al. | 254/106 |
| 3,327,310 | 6/1967 | Bethune et al. | 248/200.1 X |
| 3,570,412 | 3/1971 | Holman, Jr. | 410/153 |
| 3,592,434 | 7/1971 | Murray | 248/200.1 X |
| 3,593,857 | 7/1971 | Mernes | 248/200.1 X |
| 3,606,711 | 9/1971 | Lodado | 211/105.3 X |
| 4,209,099 | 6/1980 | Wickes | 211/105.3 X |
| 4,343,578 | 8/1982 | Barnes | 410/151 |
| 4,702,653 | 10/1987 | Gaulding et al. | 410/144 |
| 4,720,222 | 1/1988 | Nagy et al. | 410/151 |
| 4,737,056 | 4/1988 | Hunt | 410/151 |
| 4,824,302 | 4/1989 | Schultheis et al. | 410/151 |
| 4,834,599 | 5/1989 | Gordon et al. | 410/151 |
| 4,938,403 | 7/1990 | Cortelli | 211/123 X |

FOREIGN PATENT DOCUMENTS 433625 9/1967 Sweden .................. 410/151

Primary Examiner—Michael S. Huppert
Assistant Examiner—James T. Eller, Jr.
Attorney, Agent, or Firm—Dowell & Dowell

[57] ABSTRACT

A selectively adjustable bar lock assembly for retaining cargo being transported in vehicles or other motive devices which includes a pair of relatively telescoping tubes which are rotatable within outwardly disposed resilient cushion members and which are frictionally locked by an internal cam upon their relative rotation. In some embodiments, separate or integrally formed retention receptacles are used to receive the cushion members to positively align the cushion members relative to the walls of the vehicles.

12 Claims, 3 Drawing Sheets

CARGO BAR LOCK ASSEMBLY

BACKGROUND OF THE INVENTION

1. Field of the Invention

This invention is generally directed to bar lock devices of a type which are utilized to secure cargo being transported in vehicles and other transportation vehicles and, more particularly, to such bar locks which include telescoping members having outer resilient cushions which are selectively engageable with the sidewalls of the vehicles and which include internal cam locks which are selectively operable by the relative rotation of the telescoping members of the locking device. In the present invention, the telescoping members are rotatable with respect to the outer resilient cushions which are enlarged with respect to the diameter of the telescoping members to thereby provide relatively yieldable frictioned surfaces which are selectively urged against the sidewalls of the vehicles upon the relative extension of the telescoping members of the locking devices.

In some embodiments of the present invention, retention receptacles are mounted to, or formed as a feature of, the interior sidewalls of vehicles, or other motive devices, and include recesses of a size to receive the resilient cushions of the locking device to thereby further inhibit or prevent accidental shifting of the locking device relative to the sidewalls of the vehicles or motive devices. Further, additional frictional retention of the bar lock devices relative to the vehicles' inner surfaces, either normal conventional or with formed-in or secondarily attached retention receptacles, may be achieved by the use of interlocking materials such as hook-and-loop textile of the type generally referred to as "VELCRO", or through the forming-in or application of a high friction surface or surface coating to the sidewall surface.

2. History of the Related Art

Over the years there have been many proposals for securing cargos within storage areas or beds of transport vehicles including trucks, cars, trains, aircraft and water vessels. It is imperative that when cargos are being transported that they be prevented from being damaged and thus means must be provided for securing cargos to prevent shifting during transport. Not only is it important from the point of view of protecting articles being shipped from damage but also to prevent injury to individuals who may be in cargo areas or are exposed to cargos during shipment.

To protect articles being shipped in larger vehicles, such as ocean going vessels, it has been proposed to utilize specially shaped containers in which the cargo is placed within the containers and thereafter on-loaded into specifically designed holding areas or cargo bays of the vessels. In this manner, the shipping containers are designed to cooperate with the cargo storage areas of the vessels to prevent movement of goods during shipment. The use of specially shaped containers, however, to protect articles being transported, is not a practical solution to shippers of small goods, individual items, or for persons utilizing conventional transportation vehicles such as pickup trucks, vans, station wagons, and the like. An alternative retention system is disclosed in U.S. Pat. No. 4,702,653 to Gaulding et al., which discloses a system for retaining freight in trailers, box cars and other larger transport vehicles. The patent discloses a series of channel members which are mounted along the sidewalls of the vehicles in which locking crossbars are retained. The crossbars are spring loaded so that the amount of pressure being applied to the bars outwardly into the channel members is selectively adjusted to prevent shifting of the bars relative to the channels. Again, however, such a system is not cost effective and could not be utilized in smaller vehicles such as pickup trucks, vans, station wagons, and rental trailers frequently used for moving goods.

In order to avoid the necessity of providing fixed structures within transport vehicles, it has been proposed to utilize portable locking assemblies which may be used to secure cargos placed within beds of trucks or storage areas of other vehicles. In U.S. Pat. No. 2,974,931 to Reel et al., an extendable locking bar assembly is disclosed which incorporates a pair of telescoping members which are supported centrally by an enlarged sleeve. Each telescoping member carries a friction pad at its outer end which is designed to engage the sidewalls of a vehicle and which is locked in frictional engagement with the sidewalls by the operation of a locking mechanism mounted through the central portions of the locking assembly. The locking assembly is utilized to adjust the amount of pressure that the pads place against the sidewalls of the vehicle but are complex and require that the installer overcome the resistance of internal springs in order to effect the frictional engagement of the mechanism with the sidewalls of the vehicle.

In U.S. Pat. No. 4,720,222 to Nagy, somewhat similar locking bar assemblies to that disclosed in the patent to Reel et al. are shown which utilize pairs of rods or bar members which are extendable by the use of over-the-center pivot assemblies which act against internal springs in order to urge elastomeric pads carried by the rods against the sidewalls of a vehicle. With this type of locking arrangement the amount of tension created is dependent upon the force developed between the two bar members with the force being applied against the sidewalls of the vehicle by the elastomeric pads. However, the pads only provide a noncompressable friction surface which protects the sidewalls of the vehicle; the pads do not assist in providing increased compressive force to aid in securing the assemblies against the sidewalls of a vehicle.

Another type of extendable bar lock assembly for securing cargo within vehicles is disclosed in U.S. Pat. No. 4,737,056 to Hunt. The assembly includes a central member having a pair of threaded cargo bed engaging arms extending outwardly on either side thereof so that upon the rotation of the central member the end units are threadingly urged towards the sidewall of a vehicle. Unfortunately, many individuals cannot provide sufficient physical strength to adequately and securely engage such a bar lock assembly within a vehicle and therefore the assembly can be loosened by any jolt to the vehicle or shifting of the load.

In view of the foregoing, the prior art does not disclose simplified, lightweight, and reliable cargo locks which may be easily installed without minimum physical effort and also does not disclose bar lock assemblies which may be broken down into individual components for storage when not in use.

SUMMARY OF THE INVENTION

This invention is directed to bar lock assemblies for retaining cargo within the load space of vehicles or other motive devices such as station wagons, trucks, vans, aircraft and watercraft wherein the locking assemblies are designed to be easily broken down into compact components for storage and which may be selectively installed by individuals without exerting a great deal of physical effort. The bar lock assemblies include pairs of telescoping members having inner and outer ends with the inner ends being frictionally locked to one another upon relative rotation of the members by internal cams carried by the inner telescoping members. The cams include a bearing surface having an axis which is offset with respect to the axis of the telescoping members and freely moveable compression rings are rotatably mounted with respect thereto so that upon the rotation of the offset axis bearing surface, the compression rings are urged against the inner walls of the outer telescoping members. The outer end of each of the telescoping members include flared portions which are seated within sockets retained in pairs of enlarged resilient cushion members formed of closed cell foam material of the type which may be compressed so as to enlarge the surface of the members against the sidewall of the vehicles as the telescoping members are extended outwardly relative to one another. Due to the resiliency of the cushion members the frictional surface area of contact and the amount of pressure applied against the inner sidewalls of the vehicles will be increased as the telescoping members are extended without requiring a great deal of physical effort. The ends of the telescoping members are rotatable with respect to the cushion elements so that the cushion members are not twisted as the telescoping members are rotated relative to one another to effect a locking engagement therebetween. To facilitate the locking of the telescoping members relative to one another, a hand grip may be provided along the outer telescoping members in overlying relationship with respect to the internal cam lock mechanisms.

In some embodiments of the present invention, special retention members are provided having depressions formed therein. The retainers are selectively mounted to the sidewalls of a vehicle. The depressions define sockets having a diameter which will cooperatively permit the reception of the outer cushions of the bar lock assemblies to thereby assure the positive alignment of the cushions relative to the sidewalls of a vehicle and to prevent any premature slippage of the bar lock assemblies during installation. In some embodiments, the retention members may be integrally formed as depressions in the inner sidewalls of a vehicle or other motive device. Further frictional retention of the cushions relative to the retention members may be provided by placing interengaging hook and loop fabric material on the surfaces within the depression of the retention members, or formed-in depressions and on the cushion members, or through the forming-in or application of a high friction surface or surface coating.

It is a primary object of the present invention to provide a bar lock assembly for retaining cargo in the storage area or bed of trucks, vans, station wagons, boats, aircraft and other vehicles or motive devices which includes a pair of telescoping members which are selectively locked in an extended relationship with respect to one another by the use of a cam lock carried by the internal telescoping member in such a manner that the members may be freely disassembled or separated from one another to permit a compact storage of the bar lock assembly when not in use.

It is another object of the present invention to provide a bar lock assembly for securing cargo within a storage area of a vehicle or other motive device such as in the bed of a pickup truck which includes enlarged resiliently yieldable cushion members for engaging the inner and opposing sidewalls of the vehicle and which are designed to be compressible so as to expand relative to the sidewalls upon the relative extension of a pair of telescoping members so that the amount of frictional contact between the bar lock assembly and the vehicle is increased with relatively little force being required during the extension of the telescoping members.

It is also an object of the present invention to provide a bar lock assembly for retaining cargo within the storage space of a vehicle or other motive device which utilizes telescoping tubular members which are forced outwardly towards the opposing sidewalls of the vehicle and to which are rotatably mounted compressible resilient cushion members which exert a force against the sidewalls of the vehicle without being twisted or rotated relative thereto.

It is yet another object of the present invention to provide a bar lock assembly for securing cargo within the storage area of a vehicle or other motive device wherein enlarged resilient cushion members are provided for engaging the opposing sidewalls of the vehicle which members are of such structure that, should the bar lock assembly become accidentally dislodged, the cushion members will protect persons adjacent the locking assembly from possible injury.

It is a further object of the present invention to provide a bar lock assembly for use in retaining cargo in vehicles or other motive devices and especially smaller vehicles such as pickup trucks, vans, station wagons, personal watercraft and the like which locks may be manufactured more economically than conventional bar lock assemblies and which may be utilized without the need to exert the physical effort which is traditionally necessary with conventional bar locks.

It is another object of the present invention to provide a bar lock assembly for securing cargo within vehicles and other motive vehicles which may incorporate supplemental retention members which are selectively mounted to, or formed as an integral feature of the sidewall construction of the vehicle to thereby positively align and retain the assembly relative to the sidewalls even before the assembly is extended into a secured locking engagement therewith.

DESCRIPTION OF THE PREFERRED EMBODIMENT

Figure 1:
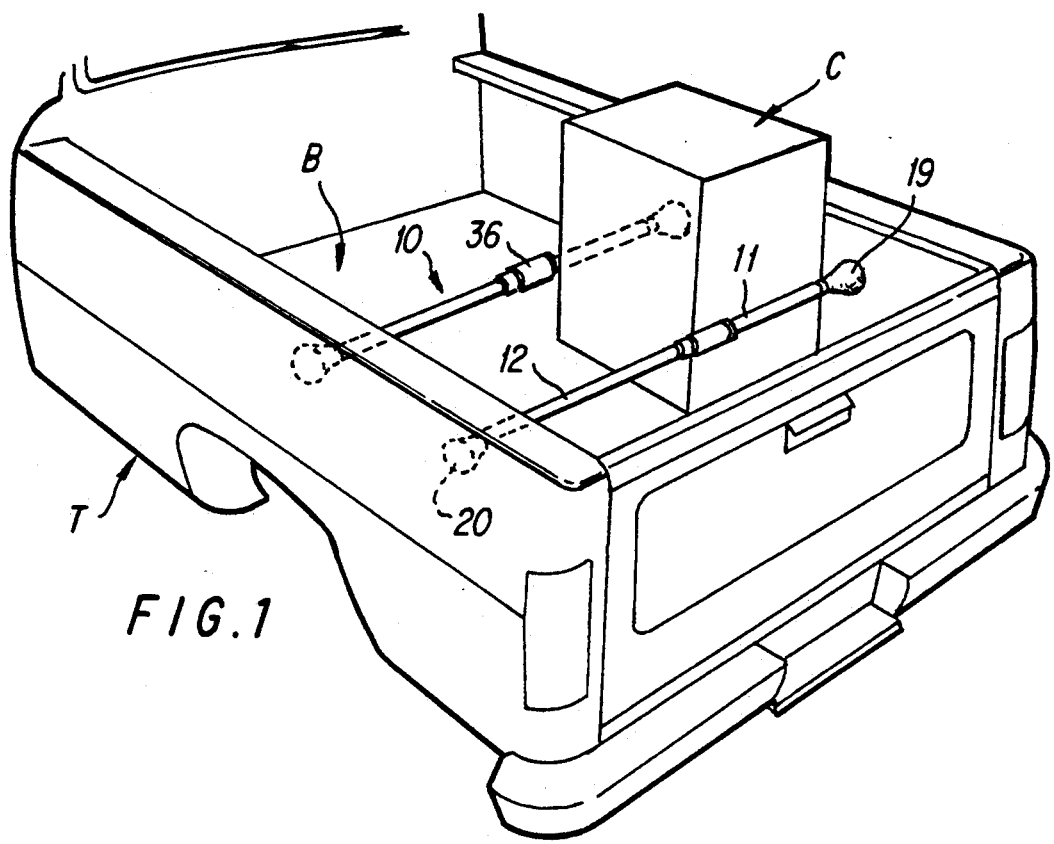
FIG. 1 is a perspective illustrational view showing two of the bar lock assemblies of the present invention being utilized to retain an article of cargo within the bed of a pickup truck wherein the bar lock assemblies are shown as engaging the sidewalls of the vehicle.

With continued reference to the drawings, a pair of bar lock assemblies 10 of the present invention are shown in FIG. 1 as retaining cargo C therebetween so as to prevent the movement of the cargo with respect to the bed B of a pickup truck T. Although two bar lock assemblies are shown as being spaced on either side of the unit of cargo C, it is of course possible to use only a single bar lock assembly by urging the load against the cab of the truck or against the tailgate. In order to provide additional protection to the cargo it is possible that a cover of canvas or other material could be extended over the cargo C with the ends thereof being secured to the bar lock assemblies 10 by the use of rings or other connecting elements. Further, in other embodiments, it is possible to use a netting extending between the two assemblies in order to provide additional retention for an item disposed therebetween.

Figure 3:
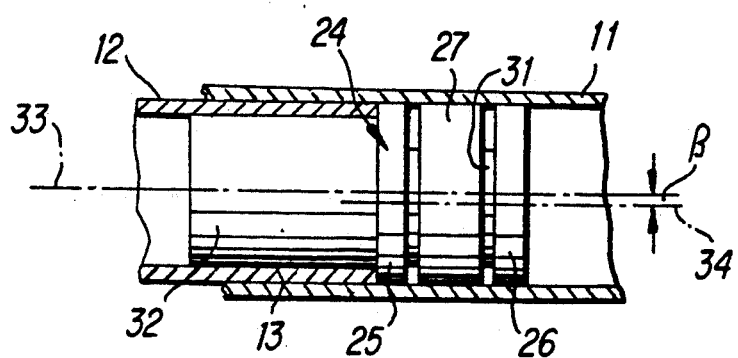
FIG. 3 is an enlarged cross-sectional view of the cam lock assembly of the present invention.

Each bar lock assembly 10 includes a pair of tubular elements 11 and 12 which are telescopically oriented with respect to one another. In this respect, tubular element 11 has an inner diameter which is slightly greater than the outer diameter of member 12 so that the element 12 is selectively receivable therein as is shown in FIG. 3. In this respect, the inner end portion 13 of member 12 is slidably received within the inner end portion 14 of the outer tubular element 11. The outer end portions 15 and 16 of the tubular elements 11 and 12 are capped by plug elements 17 and 18 which are inserted therein and which are preferably formed of a smooth plastic material.

Mounted to the outer end portions of the tubular members 11 and 12 are enlarged resilient cushion elements 19 and 20 which are shown as being generally teardrop in configuration and which are preferably formed of a closed cell foam material so that they may be readily collapsed relative to a sidewall of the vehicle such as shown in FIG. 3.

Each of the cushion elements is formed about a cushion support socket 21 and 22 which are designed to selectively receive the plugged end portions the extension elements 11 and 12. The support sockets are preferably formed of a plastic material which permits a relatively free rotational movement of the plugged end portions of the telescoping elements relative thereto. In this manner, the end portions 15 and 16 of the tubular elements 11 and 12 are freely rotatable within the cushion elements 19 and 20 so that, as the cushion elements are compressed against the inner and opposing sidewalls of a vehicle, such as shown in FIG. 1 during the extension of elements 11 and 12, any rotation of the elements 11 and 12 does not adversely affect or place any twisting movement on the cushion elements.

Figure 4:
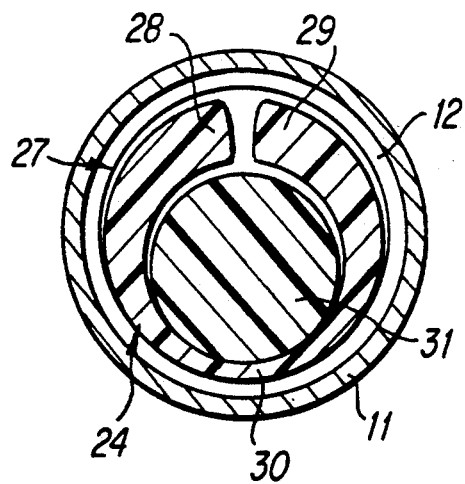
FIG. 4 is an enlarged cross-sectional view taken along lines 4—4 of FIG. 3 showing the locking cam in an unlocked relationship with respect to the outer tube of the bar lock assembly of the present invention.

To lock the tubular elements 11 and 12 in selectively extended relationship with respect to one another, a locking assembly 24 is mounted within the inner end 13 of the tubular element 12. The locking assembly includes a pair of annular flange elements 25 and 26 which are spaced relative to one another and between which is mounted a substantially closed locking member 27 having spaced end portions 28 and 29. It should be noted, and as shown in FIG. 4, that the locking member 27 has a central portion 30 which is of a lesser thickness than the portions of the locking element adjacent the ends thereof, 28 and 29, for purposes which will be discussed in greater detail.

Figure 5:
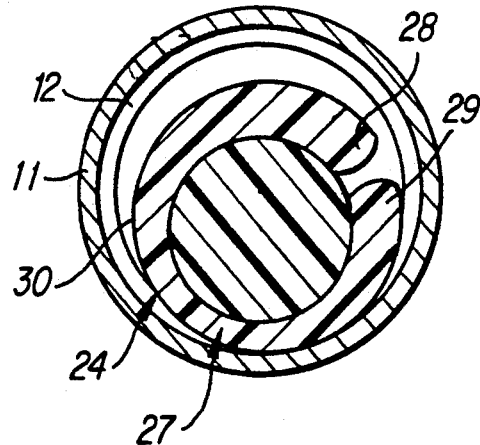
FIG. 5 is a cross-sectional view taken along lines 4—4 of FIG. 3 showing the cam lock in a frictionally engaged locking relationship with respect to the inner wall of the outer tube of the bar lock assembly of the present invention.

Each of the annular flanges 25 and 26 is fixed to a hub or stub shaft 31 extending from a central body 32 fixedly retained within the inner end portion 13 of the tubular element 12 by means of rivets or other mechanical fasteners (not shown). With respect to FIG. 3, the central axis of the tubular elements 11 and 12 shown at 33 is spaced a distance B from the axis 34 of the shaft 31. The locking member 27 is mounted about the shaft 31 and is freely rotatable with respect thereto. The diameter of the locking member 27 is such that it is generally slightly less than the inner diameter of the outer tube 11. However, whenever the outer tube 11 is rotated relative to the inner tube, or vice versa, the shaft 31 will rotate or shift relative to axis 33 and act as a cam forcing the enlarged end portions 28 and 29 of the locking member 27 against the inner walls of the outer tube 11 thereby securing the two tubular elements in frictional engagement with respect to one another. The position of locking is shown in FIG. 5 wherein the shaft 31 compresses the enlarged end section 29 of the locking ring element 27 against the inner wall of the outer tube. Unlocking of the tubular elements is accomplished by reversing the relative rotation of the elements along their longitudinal axis 33 to a point where the shaft 31 permits the enlarged portions 28 and 29 of the locking ring element 27 to move into spaced relationship with the inner walls of the outer tube 11.

As will be noted in the drawing figures, in order to separate the tubular locking elements into two portions for compact storage, it is only necessary to unlock the element 27 and withdraw the inner tubular element with the locking cam assembly 24 from the outer tubular element. When necessary, the two tubular elements may be realigned and placed into telescopic configuration. To facilitate the locking and unlocking of the tubular elements, a handgrip 36 is secured to the outer tubular element 11 adjacent the inner end portion thereof.

The material from which the locking assembly 24 and the friction locking ring element 27 are made may be selectively chosen to increase the amount of frictional resistance which may be created by the locking mechanism. In addition, it is preferred that a material be chosen which is not adversely affected by water or other climatic conditions to which the locking mechanisms of the present invention may be exposed, especially when utilized in pickup trucks and other open areas.

Figure 2:
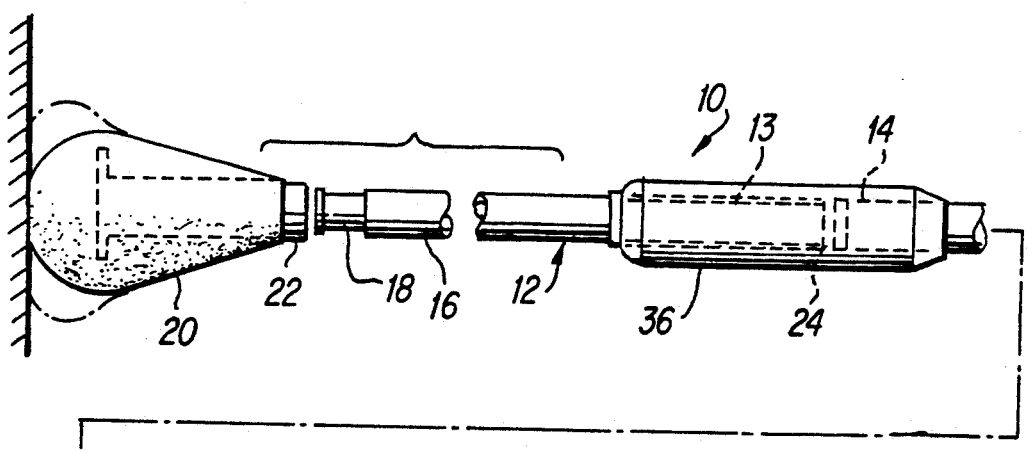
FIG. 2 is a front plan assembly view of one of the bar lock assemblies of FIG. 1 showing the relative compression of the cushion members thereof relative to the sidewalls of a vehicle.
Figure 2:
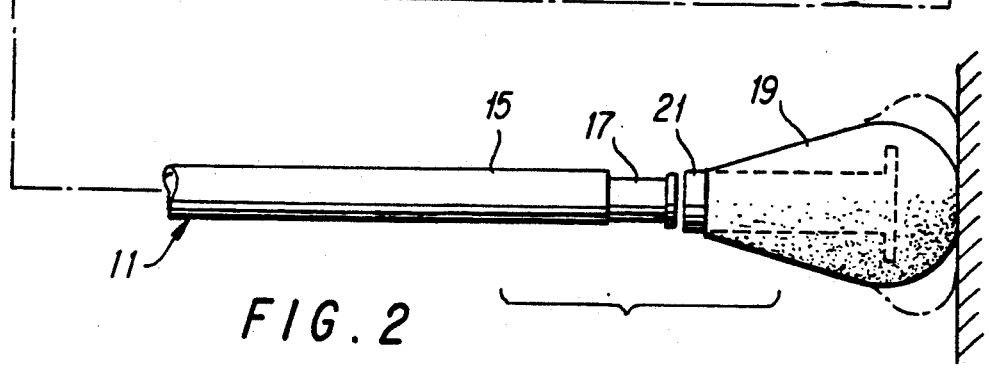

As shown in dotted line of FIG. 2 of the drawings, as the tubular elements 11 and 12 are extended relative to one another, the cushion elements 19 and 20 will compress against the sidewalls of the vehicle. In this manner, the cushion elements increase the amount of surface friction contact between the bar locks and the sidewalls of the vehicle with the cushion element also providing increased retention force along the axis of the bar locks due to the resiliency of the material itself. In most situations, the bar lock assemblies of the present invention may be utilized without any alternative structure being provided to retain the cushion elements against the sidewalls of the vehicle. However, in some instance, it may be preferred to provide supplemental materials, or alter the vehicle sidewall structure, for securing the cushion elements relative to the sidewalls of a vehicle or other motive device.

Figure 6:
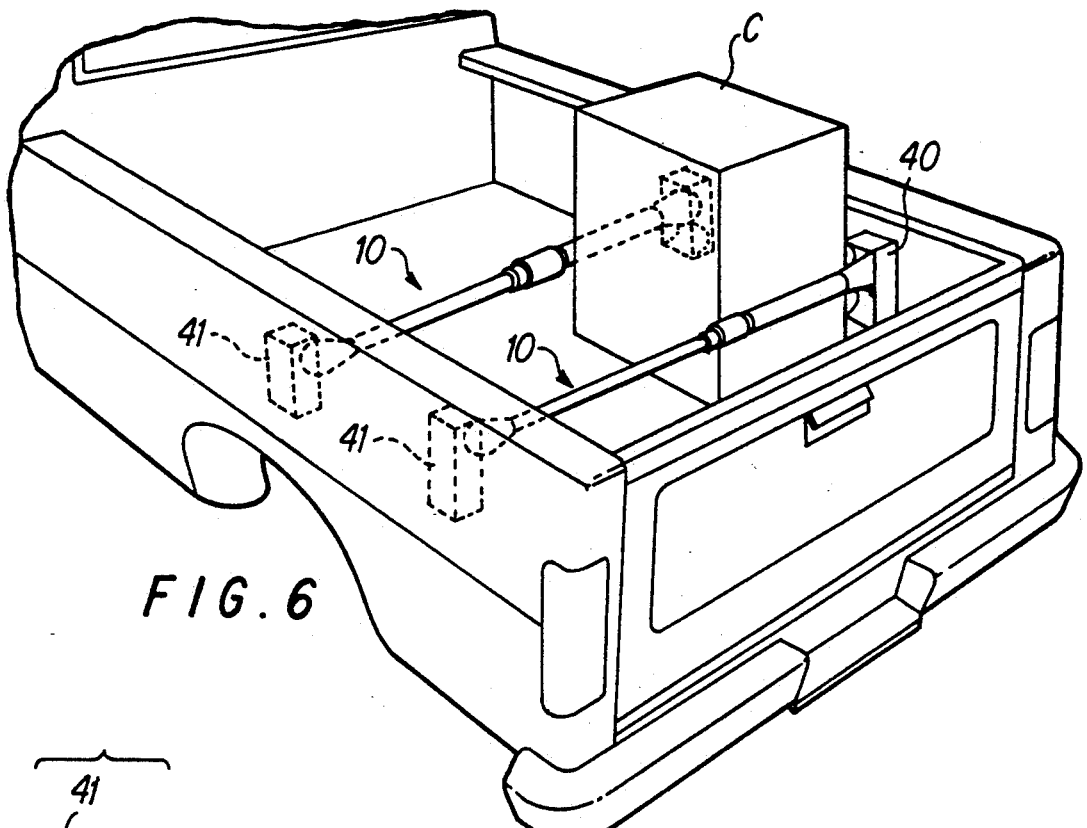
FIG. 6 is a perspective illustrational view of a pair of bar lock assemblies of the present invention shown as retaining cargo within the bed of a pickup truck wherein the bar lock assemblies are utilized with supplemental retention members which are secured to the side walls of the vehicle.
Figure 7:
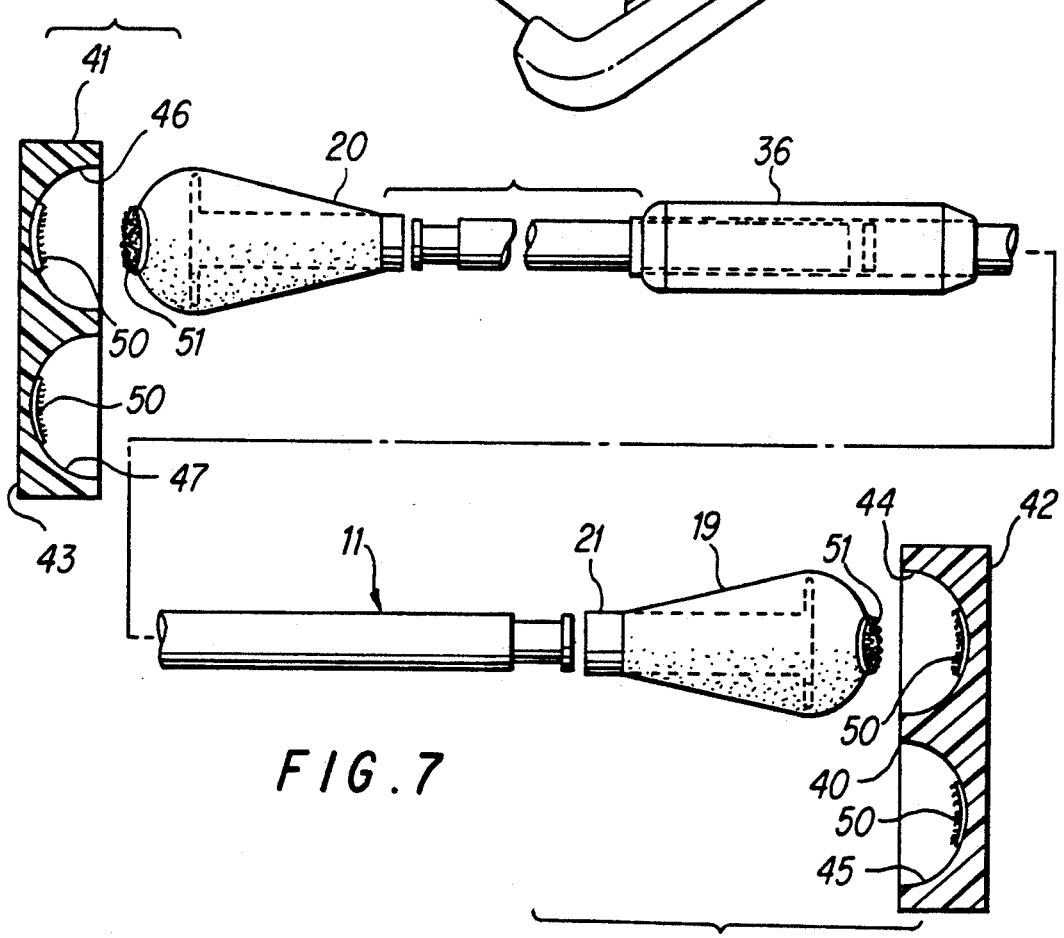
FIG. 7 is a front plan assembly view of one of the bar lock assemblies shown in FIG. 6 showing the retention members in cross section.

With specific reference to FIGS. 6 and 7 of the drawings, an alternate embodiment of the present invention is shown in greater detail. In this embodiment, an applied pair of retention members 40 and 41 are provided adjacent opposite sides of the vehicle and have base portions 42 and 43, respectively, which may be secured by fasteners, hook-and-loop textile material or suitable adhesive to the sidewalls of the vehicle or motive device. The retention members also include one or more depressions 44, 45 and 46, 47 which are of a size to selectively receive the end portions of the cushion elements 19 and 20 therein. A similar profile may also be formed directly into the surface of the sidewalls of the vehicle, and may incorporate all of the surface treatment and/or material application features illustrated in the drawings. The retention elements 40 and 41 may be formed of rigid plastic materials and the depressions may be lined with the suitable fabric materials. Due to the depressions formed in the retention elements, once the ends of the cushion elements are inserted therein, the cushion elements will be prevented from slipping laterally with respect to the sidewalls of a vehicle. In this manner, the ends of the cushion elements may be preliminarily inserted within opposing depressions of the retention members, such as shown in FIG. 6, or depressions formed in the vehicle's sidewalls, prior to fully extending the tubular elements 11 and 12 so that the bar lock mechanism is preliminarily retained in a first position prior to being fully extended.

To further increase the holding capacity or the frictional retention between the cushion elements 19 and 20 and the depressions of the retention members or integrally formed depressions, interlocking hook-and-loop textiles materials such as shown at 50 and 51 may be utilized. Once the fastening material is engaged, further movement of the cushion elements relative to the retention sockets is effectively prevented. A hook-and-loop textile material of the "VELCRO" type may be utilized.

In some embodiments it may be preferred to not utilize the retention members 40 and 41 but provide interengaging or fastening hook-and-loop materials on the outer end of the cushion elements such as shown in FIG. 6, with the opposite hook-and-loop materials being adhered to the sidewalls of the vehicle.

In the use of the bar lock assemblies of the present invention, once an item to be transported has been placed in a vehicle or other motive device, one or more of the bar lock mechanisms may be installed to prevent the shifting of the items relative to the vehicle. In any embodiment of the invention, the inner tubular element 12 is inserted within the outer tubular element 11 and the cushion elements 19 and 20 extended outwardly until they engage the sidewall of the vehicle or are inserted within the depressions formed in the retention elements 40 and 41 or integrally in the vehicle sidewalls. Thereafter, the elements are further urged outwardly in order to compress and fully secure the cushions against the sidewalls of the vehicle such as shown in dotted line in FIG. 2. Once the cushion materials have been depressed, the handgrip 36 is grasped and rotated in order to rotate the outer tubular element relative to the inner tubular element thereby effecting the locking of the locking ring 27 which binds against the inner surface of the outer tubular element 11. As previously discussed, the end portions of each of the tubular elements 11 and 12 are rotatably mounted within the cushion elements 19 and 20 by the provision of the socket members 21 and 22, about which the resilient material is molded. Once the cargo has been transported, the bar locks may be easily disassembled by rotating the handgrip 36 to allow the inner tubular member to be withdrawn from the outer tubular member. Thereafter, the two tubular members are separated for compact storage.

I claim:

1. A bar lock assembly for securing cargo within a vehicle wherein the vehicle includes opposing side walls comprising, first and second elongated members aligned along a first axis and having inner and outer end portions, said inner end portion of said second elongated member being slidably receivable within said inner end portion of said first elongated member, a locking cam means carried by said inner end portion of said second elongated member, said locking cam means including a friction lock engageable with said inner end portion of said first elongated member upon the relative rotation of said first and second elongated members, said locking cam means further including at least one annular sleeve mounted in spaced relationship from said outer end portion of said second elongated member, a support shaft for supporting said annular sleeve with respect to said outer end portion of said elongated member, said support shaft having a central axis, said friction lock being mounted in generally surrounding relationship with respect to said support shaft, said friction lock being generally in the shape of a split-ring and having spaced and opposing end portions and an arcuate intermediate portion, said friction lock being of a first thickness along said intermediate portion and a second enlarged thickness at said opposing end portions, resilient cushion means mounted to each of said outer end portions of said first and second elongated members for engaging the vehicle, a hollow socket member substantially embedded within each of said resilient cushion means, and said outer end portions of said first and second elongated members being rotatably supported within said socket members.

2. The bar lock assembly of claim 1 including first hook-and-loop fastening materials mounted in opposing relationship to the opposing side walls of the vehicle and second hook-and-loop fastening materials mounted to each of said resilient cushion means whereby said second hook-and-loop fastening materials are selectively engageable with said first hook-and-loop fastening materials mounted to the vehicle to thereby prevent lateral slipping of the bar lock assembly relative to the side walls of the vehicle.

3. The bar lock assembly of claim 1 including a pair of retention means mounted in opposing relationship to the side walls of the vehicle, each of said retention means including at least one depression therein of a size for selectively receiving one of said resilient cushion means.

4. The bar lock assembly of claim 3 including a first hook-and-loop fastening material mounted within said at least one depression of said retention means and a second hook-and-loop fastening material mounted to each of said resilient cushion means whereby said first and second hook-and-loop fastening materials are engageable with one another when said resilient cushion means are mounted within said depression of said retention means.

5. The bar lock assembly of claim 1 in which each of said resilient cushion means is formed of a foamed material.

6. A bar lock assembly for securing cargo within a vehicle wherein the vehicle has opposing side walls comprising, first and second tubular members having inner and outer end portions, said inner end portion of said second tubular member being slidably receivable within said inner end portion of said first tubular member, a locking means for selectively engaging said inner end portions of said first and second tubular members in assembled relationship, resilient cushion means mounted to each of said outer end portions of said first and second tubular members for engaging the opposing side walls of the vehicle, first hook-and-loop fastening materials mounted to the side walls of the vehicle and second hook-and-loop fastening materials mounted to each of said resilient cushion means whereby said second hook-and-loop fastening material are selectively engageable with said first hook-and-loop fastening materials mounted to the vehicle to thereby prevent slippage of said bar lock assembly relative to the side walls of the vehicle.

7. The bar lock assembly of claim 6 including means for freely rotatably mounting said resilient cushion means to said outer end portions of said first and second tubular members.

8. The bar lock assembly of claim 7 in which said first and second tubular members are aligned along a first axis, said locking means being carried by said inner end of said second tubular member and including a cam means having a friction lock engageable with said inner end portion of said first tubular member upon the relative rotation of said first and second tubular member, said cam means including at least one annular member mounted in spaced relationship from said outer end portion of said second tubular member, a support shaft for supporting said annular member with respect to said outer end portion of said second tubular member, said support shaft having a central axis which is spaced from but generally parallel to said first axis, said friction lock being mounted in generally surrounding relationship with respect to said support shaft, said friction lock being generally split-ring shaped having spaced opposing end portions and an intermediate arcuate portion, and said friction lock being of a first thickness along said intermediate portion and a second enlarged thickness at said opposing ends.

9. A bar lock assembly for securing cargo within a vehicle wherein the vehicle includes opposing side walls, the assembly comprising, first and second elongated members having inner and outer end portions, said inner end portion of said second elongated member being slidably receivable within said inner end portion of said first elongated member, a locking means for selectively engaging said inner end portions of said first and second tubular members in assembled relationship, resilient cushion means mounted to each of said outer end portions of said first and second elongated members for engaging the vehicle, a pair of retention means mounted in opposing relationship to the side walls of the vehicle, each of said retention means including at least one depression therein of a size for selectively receiving one of said resilient cushion means, a first separate fastening material mounted within said at least one depression of said retention means and a second separate fastening material mounted to each of said resilient cushion means, whereby said first and second fastening materials are interengageable with one another when said resilient cushion means are mounted within said depression of said retention means.

10. The bar lock assembly of claim 9 including means for freely rotatably mounting said resilient cushion means to said outer end portions of said first and second elongated members.

11. The bar lock assembly of claim 10 including a hollow socket member mounted within each of said resilient cushion means, said outer end portions of said first and second elongated members being rotatably supported within said socket members.

12. The bar lock assembly of claim 11 in which said first and second elongated members are aligned along a first axis, said locking means including cam means carried by said inner end portion of said second elongated member, said cam means including at least one annular sleeve mounted in spaced relationship from said outer end portion of said second elongated member, a support shaft for supporting said annular sleeve with respect to said outer end portion of said second elongated member, said support shaft having a central axis which is spaced from but generally parallel to said first axis, and a friction lock being mounted in generally surrounding relationship with respect to said support shaft, said friction lock being generally split-ring shaped and having spaced opposing end portions and an intermediate arcuate portions, and said friction lock being of a first thickness along said intermediate portion and a second enlarged thickness along said opposing end portions.

* * * * *